United States Patent [19]
Bruke

[11] Patent Number: 5,562,029
[45] Date of Patent: Oct. 8, 1996

[54] CONVEYING AND COMPACTING APPARATUS HAVING A SHAFTLESS SPIRAL IN A CASING WITH DRAINAGE OPENINGS

[75] Inventor: Richard L. Bruke, Bunkeflostrand, Sweden

[73] Assignee: Spirac Engineering AB, Malmo, Sweden

[21] Appl. No.: 291,431

[22] Filed: Aug. 16, 1994

Related U.S. Application Data

[63] Continuation-in-part of Ser. No. 69,460, Jun. 1, 1993, Pat. No. 5,337,658, and Ser. No. 879,052, Apr. 30, 1992, Pat. No. 5,368,153, which is a continuation of Ser. No. 534,159, Jun. 6, 1990, abandoned, which is a continuation of Ser. No. 457,359, Dec. 27, 1989, Pat. No. 5,000,307, which is a continuation of Ser. No. 299,944, continuation of PCT/SE88/00264 filed May 19, 1988, abandoned, said Ser. No. 69,460, is a continuation of Ser. No. 880,486, May 6, 1992, abandoned, which is a continuation of Ser. No. 550,143, Jul. 9, 1990, abandoned, which is a division of Ser. No. 236,643, Sep. 27, 1988, abandoned, which is a continuation of Ser. No. 829,142, continuation of PCT/SE85/00174 filed Apr. 16, 1985, abandoned.

[30] Foreign Application Priority Data

Apr. 19, 1984 [SE] Sweden ................................ 8402202
May 19, 1987 [SE] Sweden ................................ 8702071
May 19, 1987 [SE] Sweden ................................ 8702072

[51] Int. Cl.⁶ ........................................... B30B 9/14
[52] U.S. Cl. ................ 100/95; 100/98 R; 100/127; 100/148
[58] Field of Search ............. 100/94, 95, 98 R, 100/117, 127, 145, 147, 148; 198/608, 668, 670

[56] References Cited

U.S. PATENT DOCUMENTS

| | | | |
|---|---|---|---|
| 332,718 | 12/1885 | Lafferty | 100/95 |
| 351,014 | 10/1886 | Wissler | 198/659 |
| 377,821 | 2/1888 | Wissler. | |
| 824,008 | 6/1906 | Gowdy | 100/95 |
| 1,546,448 | 7/1925 | Hottmann | 100/145 |

(List continued on next page.)

FOREIGN PATENT DOCUMENTS

| | | | |
|---|---|---|---|
| 295277 | 12/1971 | Austria. | |
| 0333682 | 9/1989 | European Pat. Off.. | |
| 689181 | 9/1930 | France. | |
| 892666 | 5/1944 | France | 100/95 |
| 1123090 | 9/1956 | France | 100/145 |
| 1241225 | 8/1960 | France. | |
| 1494284 | 9/1967 | France. | |
| 2138968 | 1/1973 | France. | |

(List continued on next page.)

OTHER PUBLICATIONS

Screw Press—Feb. 1981—Publication of M L Engineering A B, 2 pages.
Strain Press—Jul. 1989—Publication of Picatech A B, 1 page.
Brochure "Gemeinde Fassberg" Jul. 1983, 7 pages.
Drawings Rotamat 820483, 10 pages, no date.
Drawings Rotamat hu–R–1001, 4 pages, 1984.

*Primary Examiner*—Stephen F. Gerrity
*Attorney, Agent, or Firm*—Ladas & Parry

[57] ABSTRACT

Apparatus for conveying and compacting material which includes fractions of different sizes, densities, elasticity, moisture-content, etc., wherein a shaftless spiral is disposed in a casing and the spiral is driven in rotation at an end of the casing where the material is fed into the casing. At the opposite end of the casing, i.e. a discharge end, the casing surrounds the spiral with slight play, and, moreover, the casing extends beyond the spiral to form a compaction zone. Counterpressure brakes the movement of the material to compact the material in the compaction zone. The casing is provided with drainage holes for discharge of liquid expressed from the material during passage through the casing. At the discharge end of the casing, the compacted material is cut into particles, preferably by a second spiral in a second casing which also serves to convey the cut material away from the casing.

18 Claims, 11 Drawing Sheets

U.S. PATENT DOCUMENTS

| | | | |
|---|---|---|---|
| 1,780,218 | 11/1930 | Anderson | 100/145 |
| 1,906,395 | 5/1933 | Meeks . | |
| 2,153,276 | 4/1939 | Schwabach | 198/668 |
| 2,177,179 | 10/1939 | Hendershott et al. | 198/676 |
| 2,357,220 | 8/1944 | Olson | 198/213 |
| 2,364,353 | 12/1944 | Escher . | |
| 2,397,758 | 4/1946 | Sharp | 100/98 R |
| 3,726,392 | 4/1973 | Rastoin | 188/213 |
| 3,802,551 | 4/1974 | Somers | 198/659 |
| 3,862,594 | 1/1975 | Stölting et al. | 100/95 |
| 3,908,840 | 9/1975 | Lambert Jr. . | |
| 4,391,561 | 7/1983 | Smith et al. | 414/218 |
| 4,446,788 | 5/1984 | Molnar | 100/117 |
| 4,498,382 | 2/1985 | Pera et al. | 100/117 |
| 4,520,724 | 6/1985 | Costarelli | 100/117 |
| 4,779,528 | 10/1988 | Bruke | 100/117 |
| 4,819,578 | 4/1989 | Kolso et al. | 118/652 |
| 4,824,312 | 4/1989 | Schiltz | 414/310 |
| 5,000,307 | 3/1991 | Bruke | 198/608 |
| 5,217,108 | 6/1993 | Newnan | 198/676 |

FOREIGN PATENT DOCUMENTS

| | | | |
|---|---|---|---|
| 2522585 | 9/1983 | France . | |
| 317283 | 12/1919 | Germany | 100/98 R |
| 1085465 | 7/1960 | Germany . | |
| 1551835 | 7/1970 | Germany . | |
| 3002326 | 8/1980 | Germany . | |
| 3122131 | 12/1982 | Germany . | |
| 3315946 | 11/1984 | Germany . | |
| 2905665 | 11/1985 | Germany . | |
| 365378 | 4/1939 | Italy | 100/95 |
| 615426 | 1/1961 | Italy | 100/95 |
| 61-257811 | 11/1986 | Japan . | |
| 62-116411 | 5/1987 | Japan . | |
| 73823 | 7/1948 | Norway . | |
| 106457 | 6/1965 | Norway . | |
| 360293 | 1/1973 | U.S.S.R. . | |
| 557012 | 6/1977 | U.S.S.R. . | |
| 1488233 | 6/1989 | U.S.S.R. . | |
| 188362 | 11/1922 | United Kingdom . | |
| 273249 | 6/1928 | United Kingdom . | |
| 468813 | 7/1937 | United Kingdom . | |
| 558246 | 1/1944 | United Kingdom . | |
| 838549 | 6/1960 | United Kingdom . | |
| 1251136 | 10/1971 | United Kingdom . | |
| 1322803 | 7/1973 | United Kingdom . | |
| 1371238 | 10/1974 | United Kingdom . | |
| 1417786 | 12/1975 | United Kingdom . | |
| 2072122 | 9/1981 | United Kingdom . | |

CONVEYING AND COMPACTING APPARATUS HAVING A SHAFTLESS SPIRAL IN A CASING WITH DRAINAGE OPENINGS

This is a continuation-in-part of applications:

1) Ser. No. 08/069,460 filed Jun. 1, 1993, now U.S. Pat. No. 5,337,658 (which is a continuation of Ser. No. 07/880,486 filed May 6, 1992, now abandoned, which is a continuation of Ser. No. 07/550,143 filed Jul. 9, 1990, now abandoned, which is a divisional of Ser. No. 07/236,643 filed Sep. 27, 1988, now abandoned, which is a continuation of 06/829,142 filed Dec. 9, 1985, now abandoned and, PCT/SE85/00174 filed Apr. 16, 1985); and 2) Ser. No. 07/879,052 filed Apr. 30, 1992, now U.S. Pat. No. 5,368,153 (which is a continuation of Ser. No. 07/534,159 filed Jun. 6, 1990, now abandoned, which is a continuation of Ser. No. 07/457,359 filed Dec. 27, 1989, now U.S. Pat. No. 5,000,307, which is a continuation of Ser. No. 07/299,944 filed Jan. 6, 1989, now abandoned, and PCT/SE88/00264 filed May 19, 1988).

FIELD OF THE INVENTION

The present invention relates to an apparatus for receiving, conveying and/or impacting of material in which are included fractions of different sizes, densities, elasticity, moisture-content etc., the apparatus including at least one shaftless spiral in which each spiral is disposed in a preferably closed casing and, more precisely, there are provided drive means, for the rotation of the spiral or spirals respectively, in conjunction with that portion of the casing where the material is received, and there are provided, at least for one of the combinations of casing—spiral, counterpressure members which arrest or brake the movement of the material in conjunction with that portion of the casing which serves as a discharge portion for the material.

BACKGROUND

Material of the type mentioned by way of introduction needs to be moved in many different contexts, both in industrial operations and in, for example, municipal refuse disposal and management (refuse handling, screenings from the wastewater treatment plants and so on). Consequently, such material is handled in large quantities daily and it is a reality that this handling cannot be effected without meeting a number of problems. These are because the material is, as a rule, difficult to handle, for example in that it is bulky and needs to be compacted in order to attain an acceptable level of transport economy. When the material is wet, it needs to be compacted in order to reduce the moisture-content so as thereby to make for greater ease of handling. For compacting material of the above-indicated type, the prior Art calls for the employment of separate compactors or screw presses.

One disadvantage inherent in hitherto employed combinations of conveyors and compactors is that the combinations require a great deal of space and are costly. In certain applications, hydraulic compactors are used, and in other applications, screw presses. The hydraulic compactors take up a great deal of space and operate intermittently, which occasions problems in, for example, the formation of material "bridges" at the infeed section, while the conventional screw presses find difficulty in swallowing the bridge and plug forming materials here under discussion. This is because the screw presses have a center shaft or axle about which ensnaring material such as textiles, plastic sheeting, strips etc. become wound and cause plug formation in the material flow.

SUMMARY OF THE INVENTION

The present invention constitutes a conveyor apparatus in which is included means for compaction of the material being conveyed and in which the above-indicated disadvantages are obviated to a remarkable extent. The invention relates to a combination of shaftless spiral and a casing. The combination of spiral and casing creates a compact unit of equipment which makes for reliable conveyance of the material and is used, according to the invention, to realize a compaction of the material at same time as the material is enclosed, which entails that the surrounding environment is not affected. In certain embodiments of the present invention, the employment of compaction reduces the moisture-content in the material, while in other embodiments, the compaction of the material constitutes the basis of a batch-wise discharging of the material from the apparatus.

The apparatus includes at least one shaftless spiral which is disposed in a preferably enclosed casing of, for example, U-shaped and/or circular cross-section. A drive means for the rotation of the spiral is disposed in conjunction with that portion of the casing where the material is fed into the combination of casing and spiral, while in the other section of the casing, i.e. in conjunction with the discharge portion of the casing, there is provided a zone in which the casing is of a cross-section which entails that the casing completely surrounds the spiral with slight play. Moreover, the casing is provided with an end region in the extension plane of the spiral, in which the spiral is not enclosed by the casing and/or in which a counterpressure member is disposed. In this zone and/or in conjunction with the end section, compaction of the material takes place. In that portion of the end section where the spiral is not enclosed by the casing, there is a braking or arresting effect on the material which leads to its compaction. In certain embodiments, the compaction is further amplified in that the spiral is provided with progressively diminishing pitch. The spiral is completely free, i.e. is not journalled in that end which is directed towards the discharge section of the casing.

In one embodiment of the present invention, the counterpressure member consists of a spring-loaded counterpressure plate which is movably journalled in the upper defining surface of the casing and/or in conjunction with the discharge opening of the casing. In certain embodiments, the counterpressure plate is disposed in a receptacle chamber. In other embodiments, the braking effect of the casing on the material is amplified in that the casing, most proximal the discharge opening, is provided with reduced inner cross-section.

In yet a further embodiment, the counterpressure member consists of a receptacle device, for example a container, a hose etc., the member being shiftable in the axial direction of the casing. During rotation of the spiral, the material is conveyed into the receptacle device, the material moving the receptacle device in the axial direction of the spiral.

In still a further preferred embodiment of the apparatus, the counterpressure member consists of a shaftless spiral disposed in a casing, this casing having a infeed opening connected to the discharge opening of the delivering casing. That casing which discharges the material is, in this instance, of an orientation which entails that its axis is directed towards the center axis of the spiral and the receiving combination of casing and spiral. The pitch, speed and/or radial extent of the spiral blades are, in the receiving combination, adapted so as to occasion a braking of the material movement before the material reaches the discharge opening of the disclosed casing. Hereby, it is possible in such operation to attain a substantially complete filling of the space in the receiving casing. The substantially complete filling constitutes a precondition for being able to convey the material upwardly in a more or less vertical direction. Thus, according to the present invention, it is possible to dispose the receiving combination with its axis directed, for example, horizontally, vertically, or therebetween.

In certain embodiments, the casing is provided with drainage openings which, preferably, are located in that region of the casing where compaction of the material takes place. In such an instance, an orientation of the casing is advantageously selected so as to entail that the discharge section of the casing is placed higher than its infeed section, whereby, on compaction, the pressed out liquid is conveyed in a direction opposite to the direction of movement of the material and is drained out from the casing through the previously-mentioned drainage openings.

In a preferred embodiment of the invention, the casing is provided with drainage apertures at least in the pre-compaction zone where substantial water removal takes place and a plug of material is formed and discharged from the casing at the open end of the compaction zone, a cutting means being provided at said open end to reduce the size of the components of the material of the plug and particularly comminute the plug into dry particles of small size. In the preferred embodiment, the cutting means form a part of a subsequent conveyor so that the dry particles can be transported away from the casing. It is especially advantageous and surprising to discover that a shaftless spiral in the subsequent conveyor can serve as a cutting means to comminute the material of the plug discharged from the casing when the distance between the free end of the shaftless spiral in the casing and the outer edge of the shaftless spiral in the conveyor is at least one-half the outer diameter of the spiral in the casing. It has been found especially beneficial to provide a cover plate extending over a portion of the periphery of the shaftless spiral in the subsequent conveyor to enhance the build-up of the plug and the subsequent cutting action.

The nature of the present invention and its aspects will be more readily understood from the following brief description of the accompanying Drawings, and discussion relating thereto.

BRIEF DESCRIPTION OF THE DRAWINGS

In the accompanying Drawings:

FIGS. 8a and b are partial sections through one embodiment of the apparatus according to the present invention, in which this, in conjunction with its discharge opening, cooperates with a conveyor apparatus which includes a casing surrounding a shaftless spiral;

DETAILED DESCRIPTION OF PREFERRED EMBODIMENTS

Figure 1:
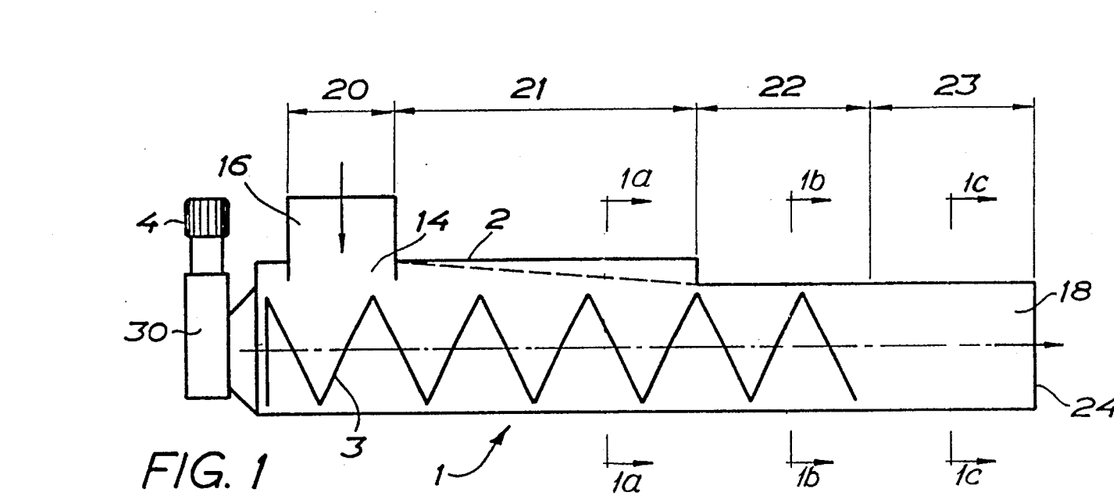
FIG. 1 is an axial section through an apparatus according to the present invention.
Figure 2:
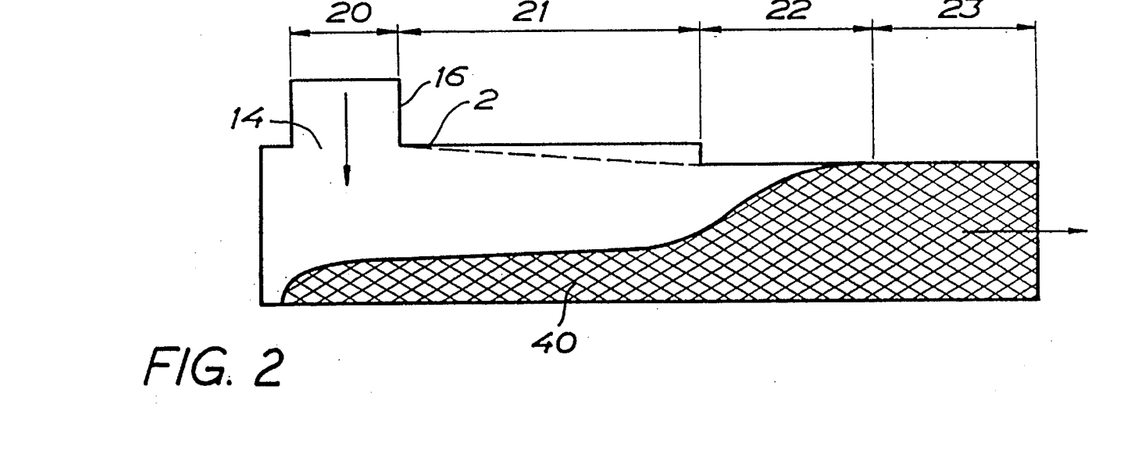
FIG. 2 shows the material distribution in the longitudinal direction of the apparatus.

Referring to the Drawings, FIGS. 1 and 2 illustrate the invention in one embodiment which shows the fundamental construction and function of the invention. In these Drawing Figures, there is shown an apparatus 1 which includes an elongate, tube-like casing 2 in which is placed a shaftless spiral 3. At its one end, the casing is provided with an infeed opening 14 which connects to an upwardly-directed drum 16. A motor 4 drives the spiral 3 by the intermediary of a gearing and journalling unit 30. The other end of the casing constitutes the discharge portion 18 of the apparatus, which is provided with a discharge opening 24. The spiral is solely journalled in connection with the gearing and journalling unit, while that end of the spiral which is directed towards the discharge portion is fully free. Thereby, the shaftless spiral 3 defines a free central annular passage 3A extending longitudinally over the length of the spiral whereby substantially the entire cross-section of the casing is available for travel of material therethrough.

Figure 1A:
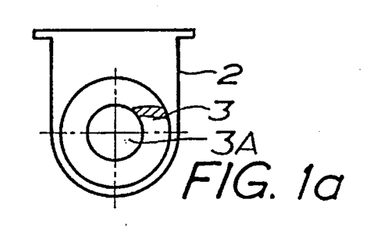
FIGS. 1a–c are sections taken along the lines 1a–1a, 1b–1b, and 1c–1c in FIG. 1.
Figure 1B:
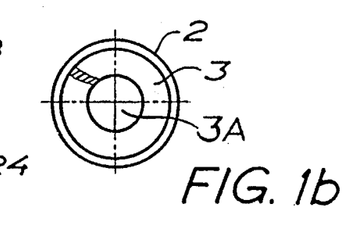
Figure 1C:
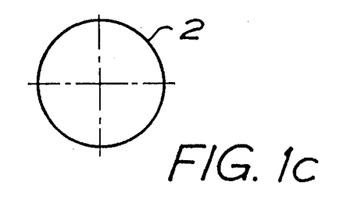

Seen in the axial direction of the casing, the combination of spiral and casing is divided into an infeed zone 20, a transport zone 21, a precompaction zone 22 and a compaction zone 23. The cross-sections through each respective zone in the illustrated embodiment are apparent from FIGS. 1a–c. It will be appreciated from these Figures that the cross-section of the casing in the precompaction zone is substantially circular and surrounds the spiral with slight play. FIG. 1 also shows by solid line a relatively abrupt transition between the transport zone 21 and the precompaction zone 22. However, in certain physical applications, the embodiment shown by broken lines is selected, with a relatively continuous transition between the cross-sections of the transport zone and the precompaction zone.

FIG. 2 shows in particular how the material flow 40 encompasses a relatively small portion of the cross-section of the casing as long as the material is in the transport zone 21, and how the material, on its passage through the precompaction zone, takes up a steadily increasing part of the cross-section in order, in the compaction zone proper, substantially to fill out the entire cross-section.

Figure 3:
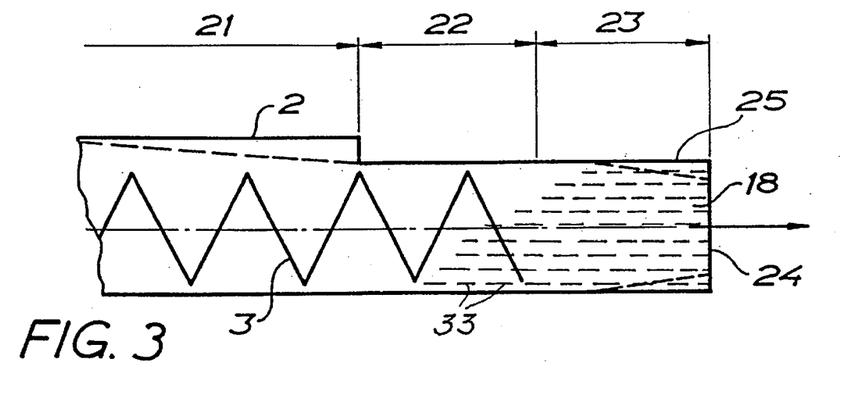
FIGS. 3–5 illustrate embodiments of the apparatus according to the present invention in which this is provided with counterpressure members for braking the material on its movement.
Figure 4A:
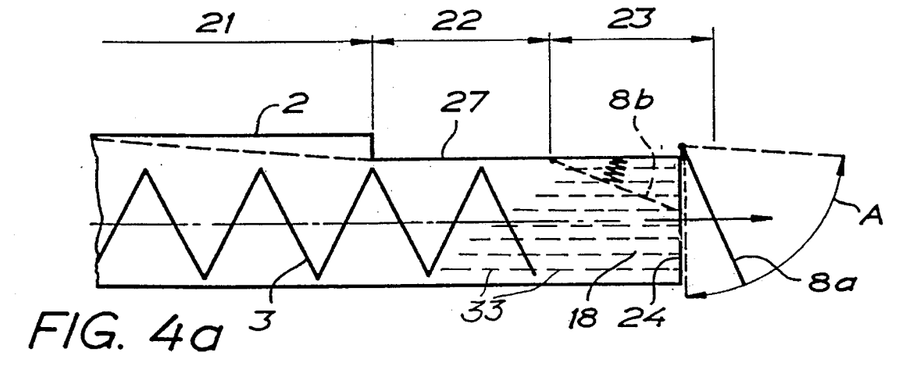
Figures 4B, 4C:
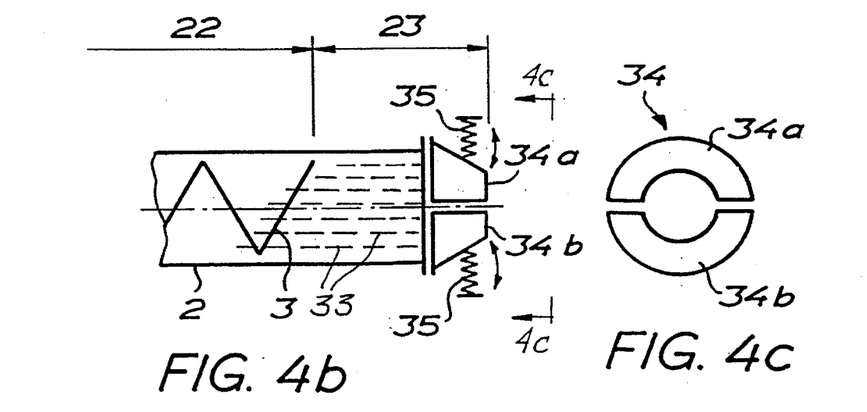

FIGS. 3 and 4a, b show how the combination of spiral and casing is provided with a counterpressure member 25, 8, for arresting or braking the movement of the material in the compaction zone 23 of the casing. In the embodiment illustrated in FIG. 3, the counterpressure member 25 is formed in that the movement of the material is braked during movement in the longitudinal direction of the casing, because of friction against the inner surface of the casing. In certain physical applications, the braking effect is amplified in that the casing is, in the region of the compaction zone 23, provided with reduced inner cross-section.

FIG. 4a shows, first, one embodiment in which the counterpressure member consists of a counterpressure plate 8a disposed in association with the discharge opening 24 and pivotally journalled in conjunction with the upper region of the discharge opening, and movable in the direction of the double-headed arrow A; and secondly, an embodiment in which the counterpressure member consists of a counterpressure plate 8b which is pivotal and preferably return spring-biased in the upper defining surface 27 of the casing 2. FIG. 4b shows a partial longitudinal section and FIG. 4c a sectional view taken along the line 4c–4c in FIG. 4b of one embodiment in which the counterpressure member consists of a split cone 34. For example, the cone comprises two halves 34a and 34b and is openable under the counteraction of springs 35 whose spring force is adapted to provide that counterpressure which is requisite to attain the intended compaction of the material.

Figure 5:
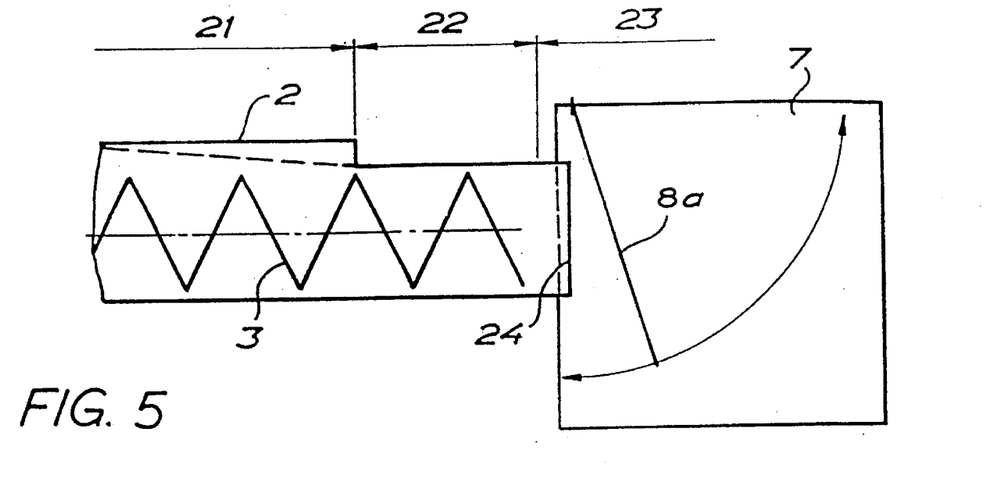

FIG. 5 shows one embodiment in which the counterpressure plate 8a, in conjunction with the discharge opening 24, is disposed in a receptacle chamber 7. In the embodiment illustrated in this Figure, the counterpressure plate is journalled in the upper defining surface of the chamber, but the journalling may, for example, correspond to that of those embodiments as shown in FIG. 4.

Figure 6A:
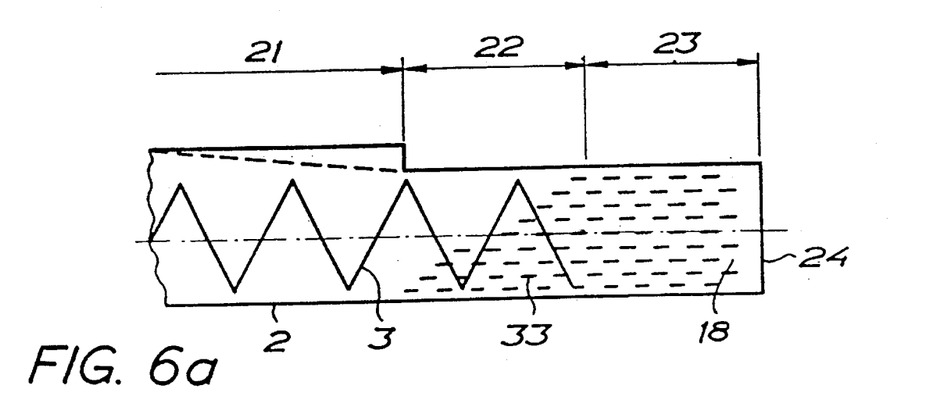
FIGS. 6a and b are partial sections through embodiments of the apparatus according to the present invention, in which the casing of the apparatus is provided with drainage openings.

FIGS. 6a and b show embodiments in which the casing 2, in conjunction with the precompaction zone 22 and the compaction zone 23, is provided with drainage openings 33. The drainage openings are also shown in the embodiments of FIGS. 3, 4a and 4b.

Figure 7A:
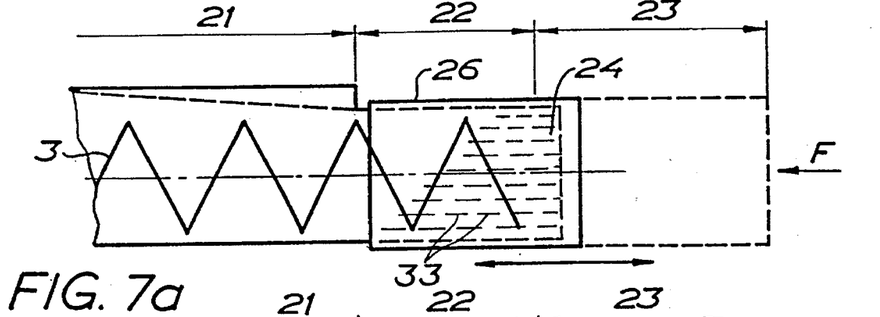
FIGS. 7a and b are partial sections through embodiments of the apparatus according to the present invention in which this is provided, in conjunction with its discharge opening with a shiftable receptacle member.
Figure 7B:
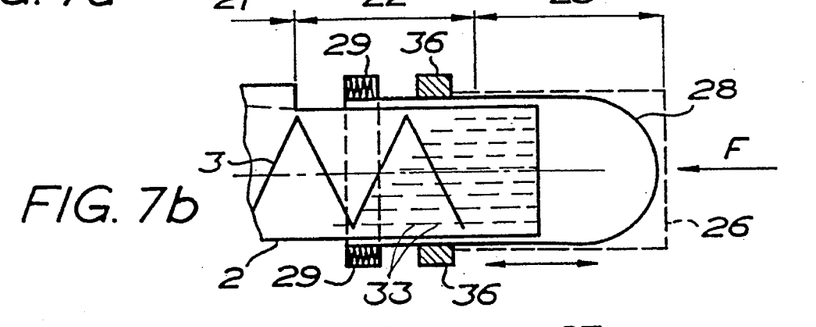

FIGS. 7a and b show embodiments of the present invention in which the counterpressure member consists of a receptacle device 26, 28, shiftable in the axial direction of the casing and, in FIG. 7a, comprising a container 26, while in FIG. 7b, a hose 28. In this instance, the hose 28 is drawn out from a magazine 29. In certain embodiments, braking means 36 are provided for restricting the withdrawal of the hose from the magazine. In the Figures, an arrow F intimates a force which is counter-directed to the movement of the container. The arrow represents a device, for example, a hydraulic cylinder. In FIG. 7a, it is shown that, in certain embodiments, the hose 28 cooperates with the container 26 (broken lines) and is brought into abutment with the inner surfaces of the container according as the hose is filled with material from the casing. Thus, FIGS. 7a and b show embodiments of the invention in which the material surrounded by the container and/or the hose is compacted.

Figures 8A, 8B:
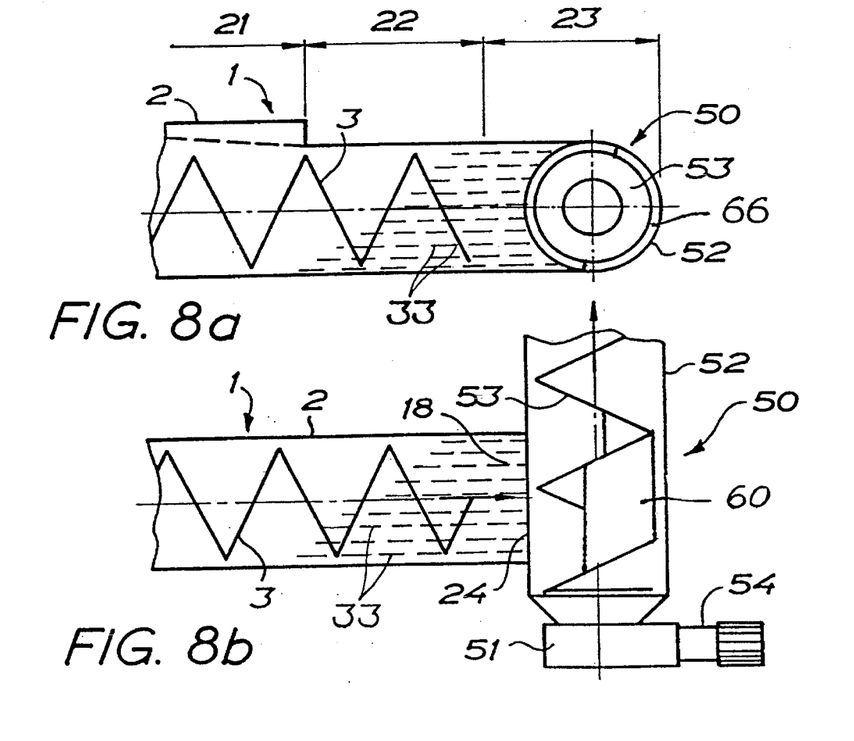

FIGS. 8a and b show one embodiment of the invention in which the apparatus 1 includes at least one supplementary conveyor apparatus 50 comprising a casing 52 and a shaftless spiral 53 placed therein. The spiral is driven by a motor 54 by the intermediary of a gearing and journalling unit 51 and its speed is, thus, for example by modification of the gear ratio, adjustable to any desired level. The direction of the first spiral 3 and/or a central shaft of the discharge end 18 of the casing is towards the central axis of the spiral 53 of the conveyor apparatus. The opening surface area of the discharge opening 24 of the casing 2 substantially agrees with the cross-sectional area of the receiving casing 52, both of the casings being substantially sealingly interconnected. The conveyor apparatus 50, is, in certain embodiments, disposed to move the material essentially horizontally, while in other embodiments, movement is effected during alteration of the level of the material. There are also embodiments of the present invention in which the casing 52 of the conveyor apparatus 50 with the spiral placed therein, has a substantially vertical direction. In this instance, the free end of the spiral is directed upwardly.

Figure 9A:
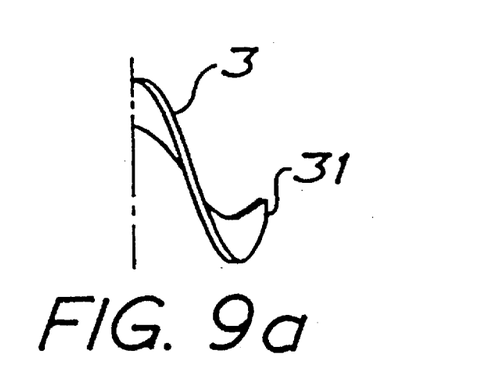
FIGS. 9a–c show details of the free end of the spiral.
Figure 9B:
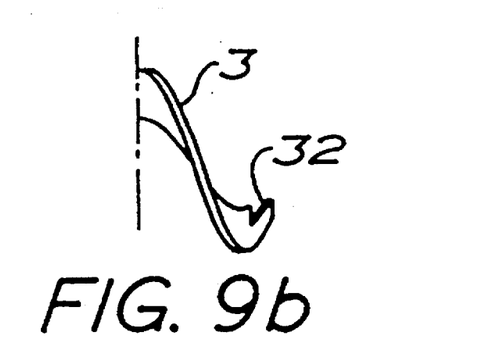
Figure 9C:
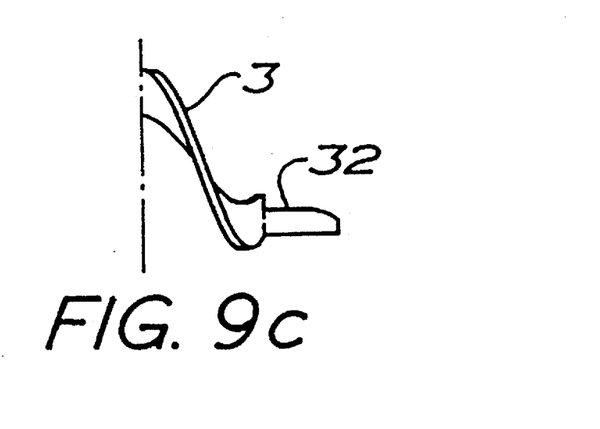

FIGS. 9a–c show, embodiments of the free end 31–32 of the spiral 3. In FIG. 9a, the end 31 of the spiral terminates in such a manner that its blade height continuously diminishes from the inner and outwardly, i.e. the center hole of the spiral increases progressively. FIGS. 9b and c show embodiments in which the end 32 of the spiral is disposed for a gradual reduction of its blade height.

Material which is supplied to the apparatus 1 through the infeed opening 14 in the casing 2 is moved in a direction towards the discharge opening 24 by rotation of the spiral 3. As will be apparent from FIG. 2, a gathering of material takes place in the precompaction zone 22 partly in that the spiral 3, in certain embodiments, has a smaller pitch than in the transport zone 21, and partly in that the movement of the material is braked in the compaction zone 23 and/or by the counterpressure members 8, 25, 26, 28, and 50. As a result, the material, in the compaction zone, as a rule substantially fills out the entire cross-section of the casing.

In FIGS. 3–5, braking is effected of the movement of the material in the compaction zone 23 by friction against the inner wall of the casing in the compaction zone (FIG. 3), by the action of the counterpressure plates 8a, 8b (FIGS. 4 and 5), or by a combination of friction and pressure which is obtained in that the cross-section (FIG. 3) of the casing diminishes, or alternatively in that the casing terminates in the cone 34 (FIG. 4b).

Figure 6B:
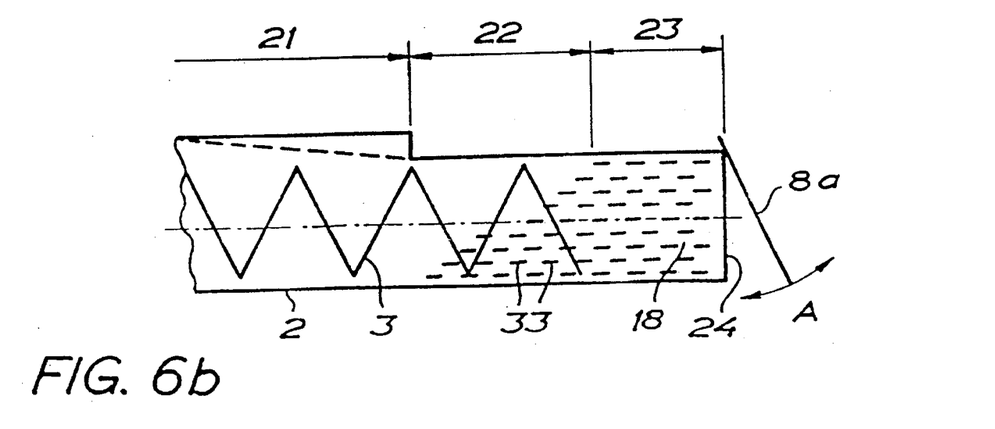

In the embodiments illustrated in FIGS. 6a and 6b, a reduction is effected of the liquid-content of the material, during passage through the precompaction zone 22 and the compaction zone 23. In many examples of physical application, the casing 2 is, in such instances, disposed such that the material is moved slightly upwardly when it passes in a direction towards the discharge opening 24. Hereby, drainage of the material will be facilitated, since a portion of the liquid will pass in a direction opposite to the direction of movement of the material and substantially in the center of the shaftless spiral, before the liquid runs out through the drainage openings 33. As a result, it will be possible for the liquid to reach the drainage openings of the casing in a region where the material has not yet had time to be compacted to any appreciable degree. Hence, as seen in FIGS. 6a and 6b the drainage openings 33 extend over an axial extent of the casing which gradually increases from the top of the casing to the bottom of the casing. The drainage openings at the bottom of the casing extend from the beginning of the precompaction zone 22 whereas the drainage openings at the top of the casing extend from the beginning of the compaction zone 23.

On movement of material into the container 26 or into the hose 28 (Cf. FIGS. 7a and b), the container, the hose—or alternatively the hose in combination with the container—is progressively forced out from the casing 2 by the action of forces from the material, at the same time as the material is compacted and then attains, as a rule, a degree of compaction which is in addition to the previously-attained compaction.

In the embodiment illustrated in FIGS. 8a and b, the conveyor apparatus 50 constitutes a counterpressure member in that the dimensions, pitch and speed of the spiral 53 have been selected such that the material is braked in its movement on passage out from the discharge opening 24 of the casing 2. There will hereby be obtained the desired compaction of the material when this is located in the casing 52 of the receiving combination, and thereby requisite filling of the casing of the receiving combination.

The above-described counterpressure members are, in certain embodiments, combined so that, for example, there will be included in one and the same apparatus, a counterpressure plate 8a, b, and a terminating conical portion of the casing; a counterpressure plate 8a, b, and a shiftable receptacle member 26, 28; a cone 34 and the receiving casing 52 with spiral 53; and so on.

In certain physical applications of the invention, a braking of the material takes place in the precompaction zone to such a great extent that at least that section of the casing located most proximal the compaction zone will be as good as completely filled with material. The thus compacted material is thereafter caused to leave casing through its discharge opening 24 in batches whose size is determined by the rotation of the spiral (the angular alteration which the spiral undergoes), in conjunction with each discharge occasion. Hence, the present invention offers a simple and reliable technique for the batchwise discharge, with a relatively degree of accuracy, of material from an apparatus according to the present invention.

Referring to FIGS. 1, 2 and 6, the material which travels in the casing 2 has the water removed therefrom through the drainage opening 33 and a plug of dewatered material is formed in the compaction zone 33. A tail of the plug extends rearwardly from the compaction zone 33 into the central passage 3A of the shaftless spiral in the pre-compaction zone 22, thereby contributing to pressurization of the material in the pre-compaction zone 22 to promote drainage thereat. The plug of material discharged from the casing 2 at the discharge end 24 of the compaction zone 23 is preferably comminuted or cut by a cutting means in order to produce a relatively fine, dry product. In a preferred embodiment, the cutting means is formed by disposing at the discharge end 24 the second conveyor 50 shown in FIGS. 8a and 8b, the construction of which is described in more detail in FIGS. 11a, 11b and 14. Namely, the shaftless spiral 53 in the second conveyor 50 in FIGS. 8a and 8b serves to comminute or cut the plug of material fed into the second conveyor and transport the thus cut material for discharge from the second conveyor. It has been found especially beneficial for the formation of the plug to provide a cover plate 60 on the shaftless spiral in the second conveyor 53, the cover plate 60 being located at the level of the outlet opening 54 in the first conveyor 1 and extending over a portion of the circumference of the second conveyor, preferably at least ⅛ of the circumference up to one-half of the circumference of the conveyor. The cover plate 60 is located at the periphery of the shaftless spiral and extends longitudinally between adjacent windings of the spiral. During commencement of operation, the spiral 53 is stationary and the cover plate 60 closes at least a part of the opening 54. Thereby, the cover plate acts to block discharge of material from casing 2 and promote formation of the plug. When the plug is properly formed, the shaftless spiral in the second conveyor is driven in rotation to efficiently cut the plug of material discharged from the compaction zone of the first conveyor into the smaller size particles.

Figure 10:
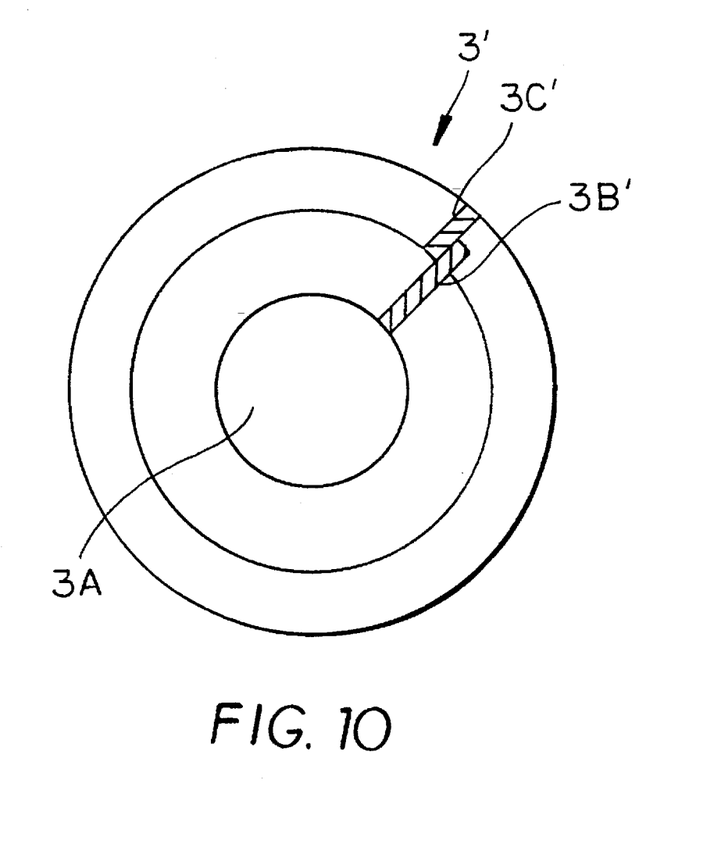
FIG. 10 is a section similar to FIG. 1a of another embodiment of the shaftless spiral.

Instead of being constructed as a flat blade of rectangular cross section, the shaftless spiral 3 (FIG. 1) and 54 (FIGS. 8a and 8b) can have the construction shown in FIG. 10 where the shaftless spiral 3' is composed of an inner central portion 3B' of rectangular cross section and an outer portion 3C' secured to the inner portion and projecting radially therefrom. The inner and outer portions overlap, the inner portion 3B' being of greater size than the outer portion 3C', the outer portion 3C' being harder and more abrasion resistant than the inner portion. The construction of the spiral 3' of FIG. 10 corresponds substantially to that disclosed in U.S. Pat. No. 5,092,453.

Figures 11A, 12A, 12B, 12E:
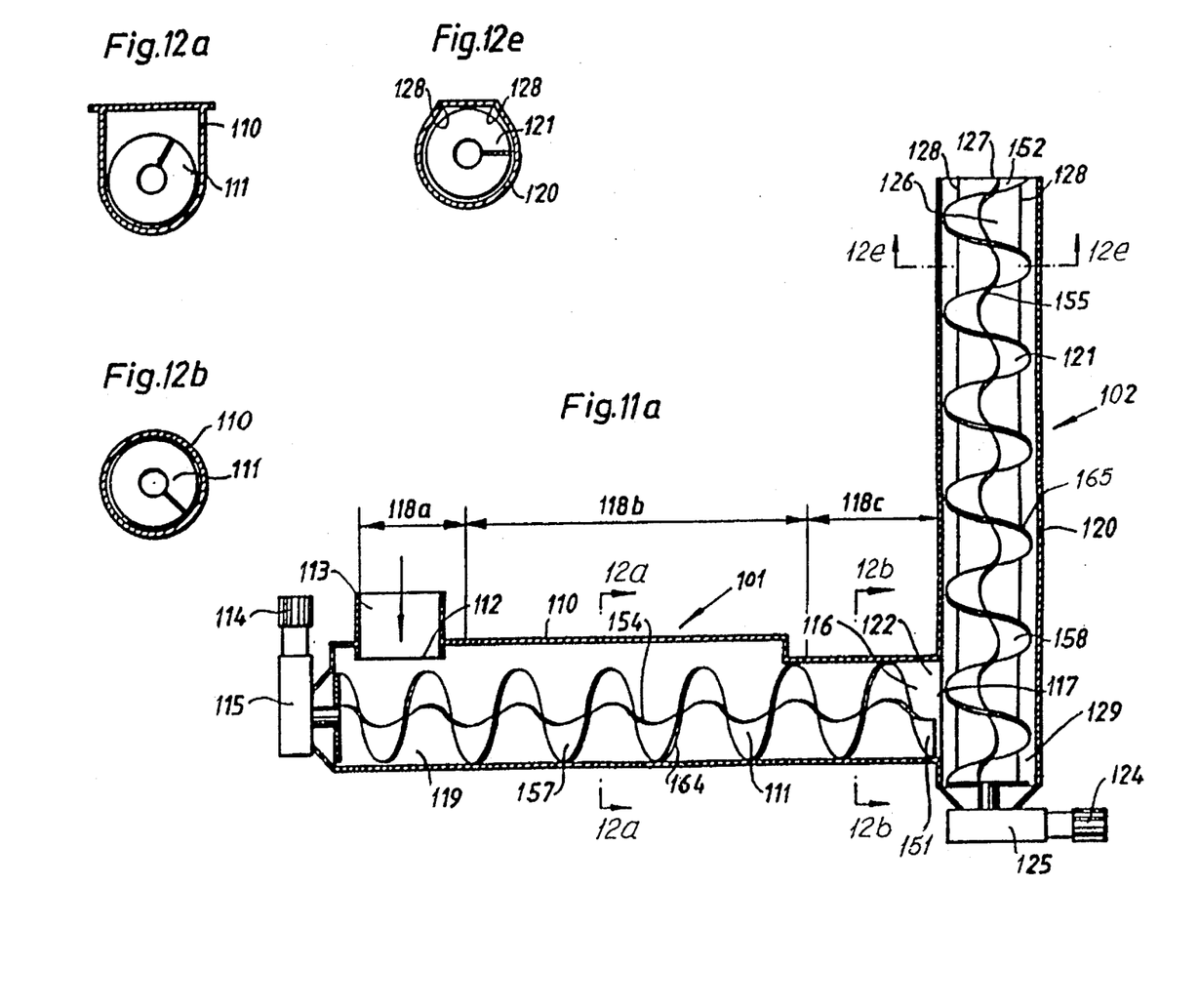
FIGS. 11a, 11b show a section in the vertical plane through art arrangement in accordance with the invention in alternative embodiments.
FIGS. 12a–e show sections 12a–12a, 12b–12b, 12c–12c, 12d–12d, 12e–12e in FIG. 11a and FIG. 11b, respectively.
Figures 11B, 12C, 12D:
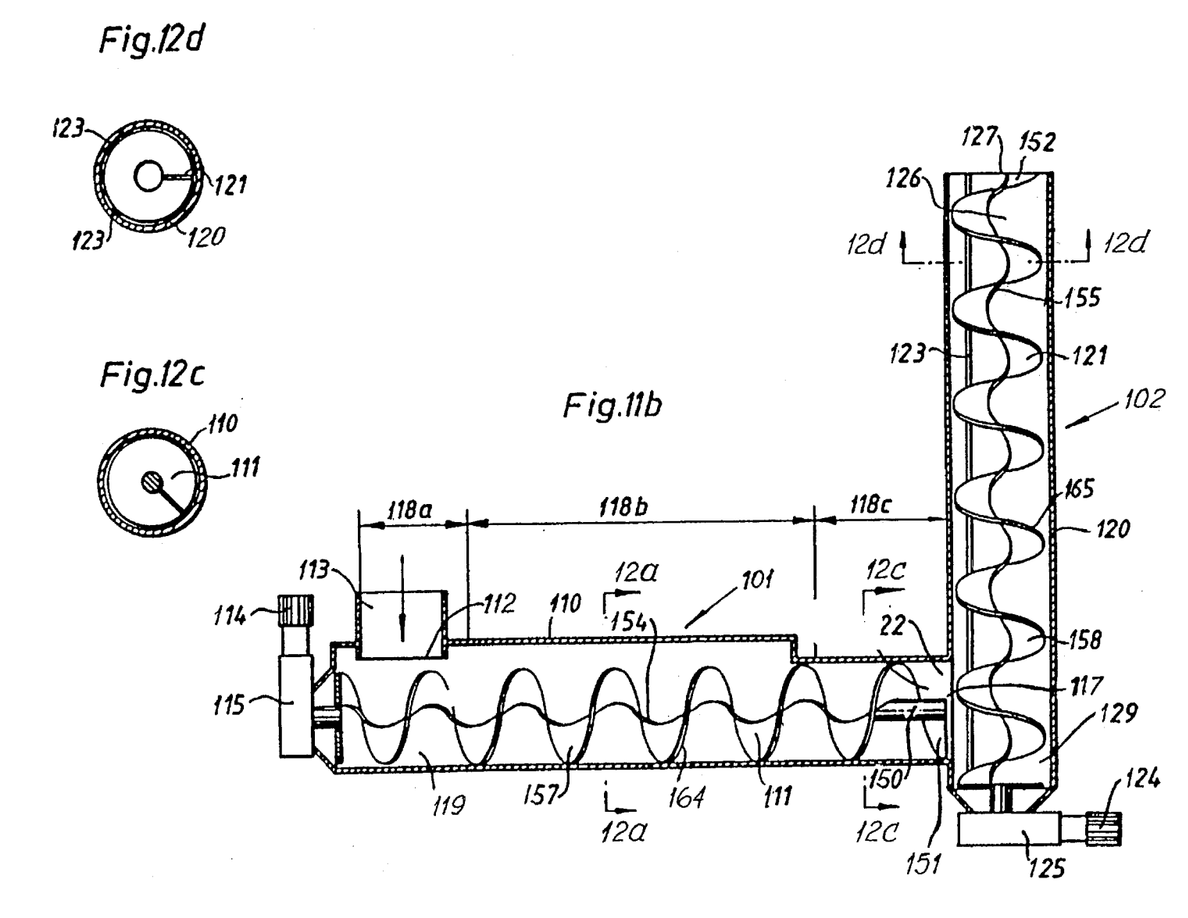

FIGS. 11a and 11b illustrate the invention in an embodiment which shows the main construction and function of the invention. In the Figures will be found a first conveyor or combination 101 of a first tubular casing 110 and a first shaftless spiral 111, forming a screw-blade 157 with a boundary (edge) 154 facing towards the center and a boundary (edge) 164 facing away from the center, located in the casing. The casing as a rule has a substantially horizontal orientation. At one end the casing forms a feed section 119 provided with one or more feed openings 112 which as a rule connect to an upwardly directed feed drum or feed hopper 113. A motor 114 drives the shaftless spiral 111 via a change-gear and bearing assembly. The other end of the casing constitutes the discharge section 116 of the combination with its discharge opening 117. The spiral is solely supported in conjunction with the change-gear and bearing aggregate while the end 151 of the spiral which is located in the discharge section is entirely free. As a consequence of the elasticity of the spiral in the radial direction, the boundary 164 of the spiral facing away from the center rests against the casing in the base area of the latter except nearest the change-gear and bearing assembly 115.

In the discharge section the casing always has a substantially circular cross-section and surrounds the shaftless spiral with slight play. In the embodiment shown in FIG. 1b a substantially cylindrical body 150 is arranged in the discharge section 116 and located in the region of the geometric center axis of the spiral. The body is located in the central passage of the spiral and is surrounded by the spiral. In this embodiment too the spiral terminates with a free end 151 in the discharge section 116.

In FIGS. 11a and 11b can be found also a second combination 102 of a construction substantially corresponding to that described above for the first combination. The second combination thus comprises a second casing 120 and a second shaftless spiral 121 located therein forming a screw blade 158 of, as a rule, substantially rectangular cross-section and a boundary (edge) 155 facing towards the center and, a boundary (edge) 165 facing away from the center. The longitudinal axis of the casing in the second combination is of a substantially vertical orientation or forms a relatively wide angle with the horizontal plane. As a rule the angle exceeds 50°, preferably 70° and is frequently 90°. In the lower section of the combination 102 will be found a feed section 129 with a feed opening 122 which overlaps the discharge opening 117 of the first casing. The spiral is driven by a motor 124 via a change-gear and bearing assembly 125 located in the lower section of the combination below the region of the feed opening 122. The speed of rotation of the spiral is adjustable to the desired value by changing the gear ratio and/or the motor speed. At the other end of the casing can be found the discharge section 126 of the casing with a discharge opening 127 which in the embodiment shown is located in the axial direction of the shaftless spiral. The shaftless spiral terminates in the discharge section with a free end 152.

In the first combination in the region of the discharging section 116 the geometric center axis of the spiral and/or a central axis of the discharge section are directed towards the geometric center axis of the spiral 121 of the second combination. The area of the cross-section of the discharge opening 117 of the first casing 110 as a rule corresponds substantially to the area of the cross-section of the receiving casing 120, at least in the region of the feed section of the receiving casing, the two casings as a rule being tightly joined to one another. In some embodiments the discharge opening 117 is smaller. The free end 151 of the first spiral as a rule terminates closely adjoining the region through which passes the screw-blade 158 of the spiral 121 of the second combination.

Seen in axial direction of the first casing 110 the first combination 101 of shaftless spiral and casing is divided into a charging zone 118a, a discharge zone 118c which terminates with the discharge opening 117 and in some embodiments with a conveying zone 118b therebetween.

In FIGS. 12a–12c are shown examples of the cross-sections of the respective zones. As a rule the cross-section of the casing in the conveying zone of the first casing is chosen to be U-shaped whereas in its discharge zone 118c it is as a rule circular. The casing encloses the spiral with slight play in the discharge zone. In applications where goods in large pieces are included in the material which is to be conveyed, the play is chosen to be relatively large so as to avoid any danger of jamming. In certain applications the casing has a substantially circular cross-section in the charging zone as well as in the discharge zone, the size of the cross-section of the respective zones as a rule being in agreement.

FIG. 12d shows an embodiment of the casing 120 of the second combination wherein the casing along its inner boundary surface is provided with at least one riblike means 123 which extends substantially in the longitudinal direction of the casing. The casing encloses the spiral 131 with relatively slight play.

FIG. 12e shows an alternative embodiment of the casing 121 of the second combination 102 where the cross-section of the casing is of an irregular shape and as a rule has one or several relatively sharp corners 128, as indicated in the figure.

The riblike means in FIG. 12d and the irregular shape or corners respectively in FIG. 12e serve to increase the friction between the respective casing and the material which abuts against the same.

Figure 13A:
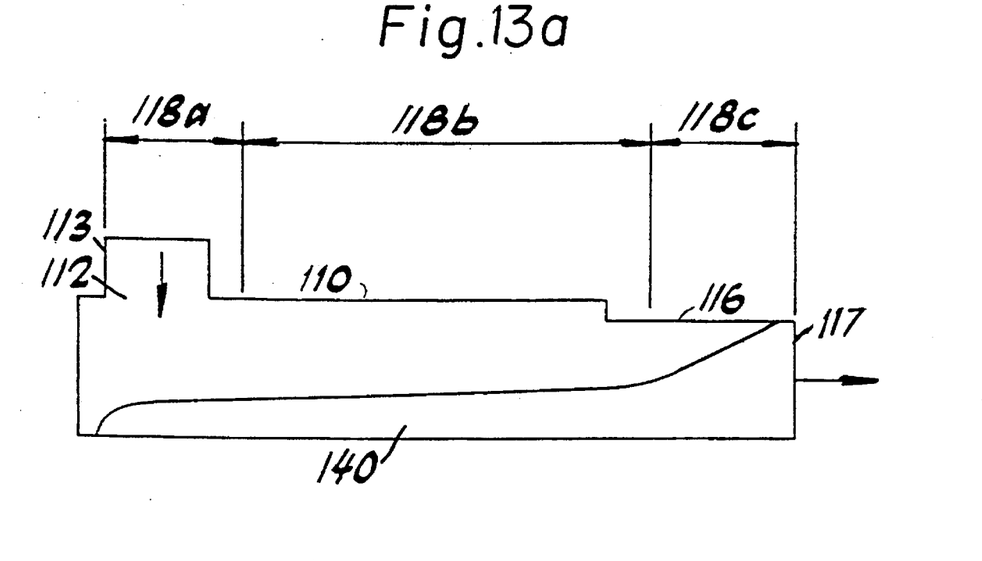
FIGS. 13a–13b show the distribution of the material conveyed in the lower, substantially horizontal part of the arrangement in accordance with FIGS. 11a and 11b, respectively.
Figure 13B:
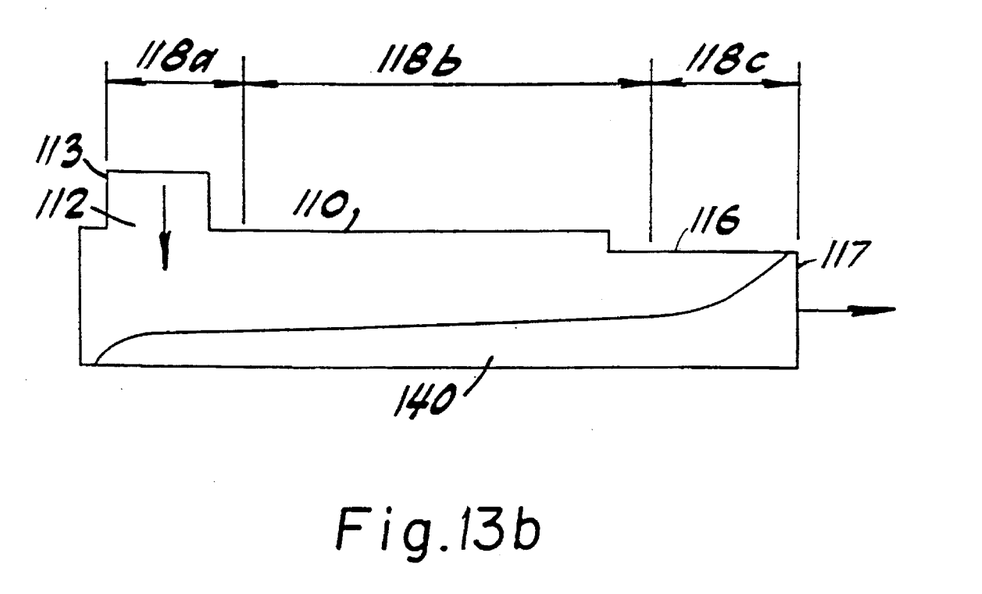

FIGS. 13a and 13b show how during the conveying the material 140 in the first combination in the region adjoining the discharge opening 117 of the casing fills up substantially all the available space in the discharge section 116 of the combination. The cylindrically shaped body 150 according to the embodiment in FIG. 11b to a certain extent hinders material in the feed section of the second combination from falling back into the discharging section of the first combination.

Figure 14:
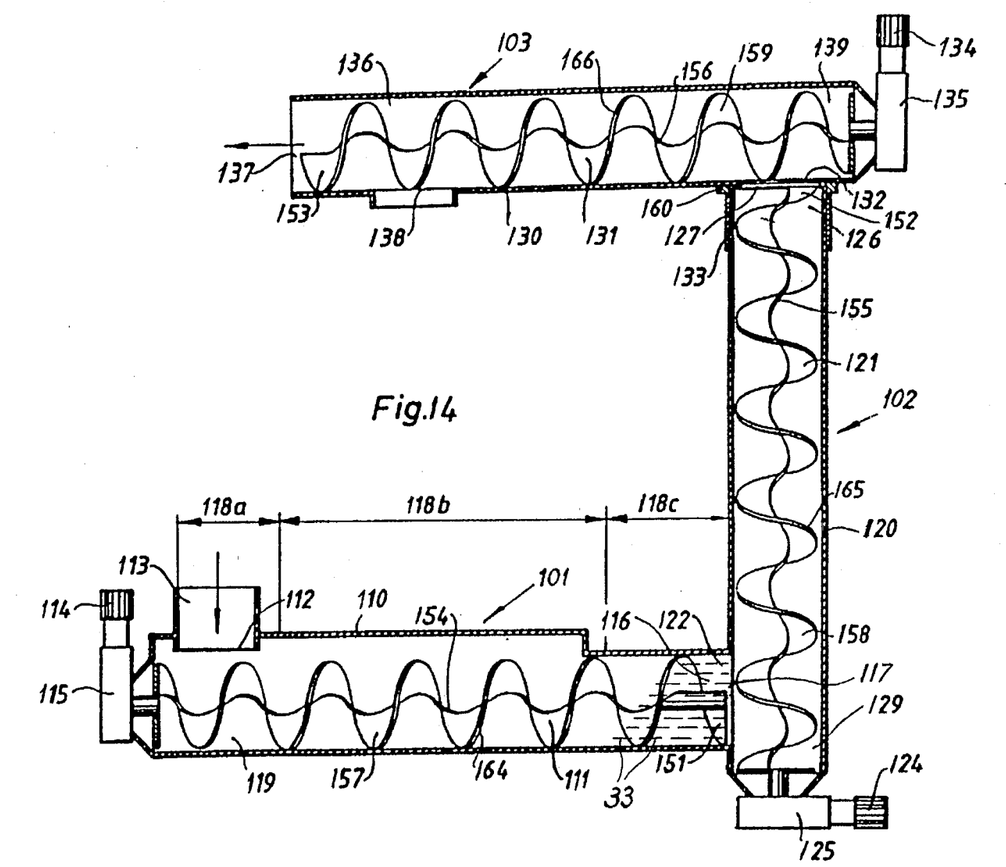
FIG. 14 shows a section in the vertical plane of an embodiment of the arrangement with a substantially horizontally directed upper conveying means.

In FIG. 14 is shown an embodiment wherein the above described combinations 101 and 102 are completed by a third conveyor or combination 103 which also comprises a casing 103 and arranged in the casing is a rotating shaftless spiral 131 forming a screws-blade of as a rule substantially rectangular cross-section and with a boundary (edge) 156 facing towards the center and a boundary (edge) 166 facing away from the center. The spiral is driven via change-gear and bearing unit 135 by a motor 134 placed as a rule in conjunction with the feed end 139 of the casing. The speed of rotation of the spiral is adjustable by control of the speed of the motor and/or alteration of the gear ratio in the change-gear and bearing unit 135. The third combination is arranged in conjunction with the discharge section 126 of the second combination and is connected to the casing 120 of the second combination via a coupling and/or bearing unit 160 of circular cross-section. A joint 133, likewise of circular cross-section, encloses the discharging section 126 of the second casing and the third combination is rotatably adjustable in relation to the discharging section of the second casing. The joint in its section located adjoining the third casing forms a feed opening 132 to the third casing, this feed opening constituting a downwards facing opening in the third casing. In the region nearest the feed opening rotates the free end 152 of the second spiral as a rule closely adjoining the path or track of the screw-blade of the third spiral. As a consequence of the elasticity of the spiral in the radial direction the boundary 116 of the spiral facing away from the center rests against the casing in the bottom region of the latter except nearest the change-gear and bearing unit 135. The material which is conveyed through the discharge opening 127 of the second casing passes through the joint 133 and from underneath into the third casing through its feed opening.

The casing of the third combination is provided in its discharge section 136 with one or more discharge openings which are located one after the other in the longitudinal direction of the casing. As a rule one discharge opening 137 is located in the axial direction of the casing whereas one or more discharge openings 138 form openings in the casing facing downwards. The shaftless spiral 131 terminates in the discharge section of the casing with a free end 153 which is facing towards the discharge opening 137 located in axial direction of the casing. FIG. 14 shows an embodiment wherein the first combination is provided with a cylindrical body 150. In certain applications the first combination 101 has the construction shown in FIG. 11a, that is to say the combination lacks the cylindrical body 150.

Figure 15A:
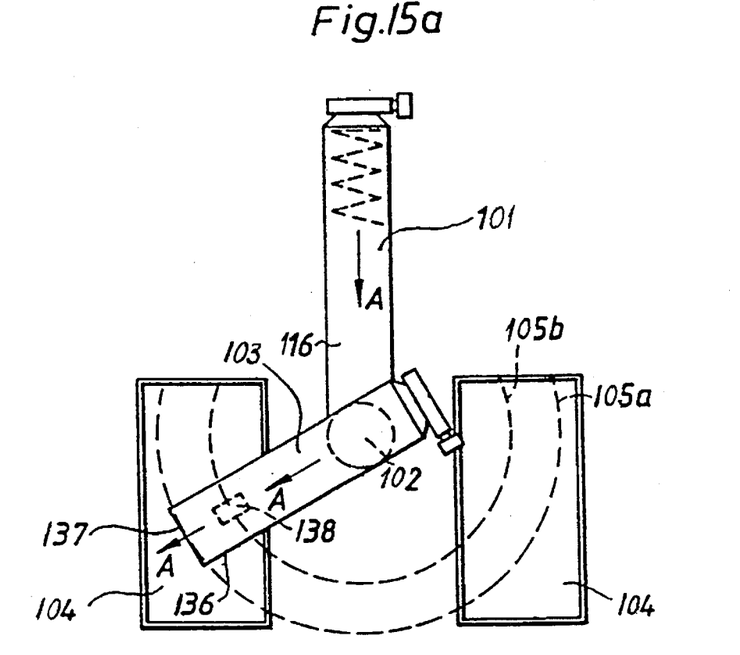
FIGS. 15a, 15b show the arrangement in accordance with FIG. 14 seen from above.
Figure 15B:
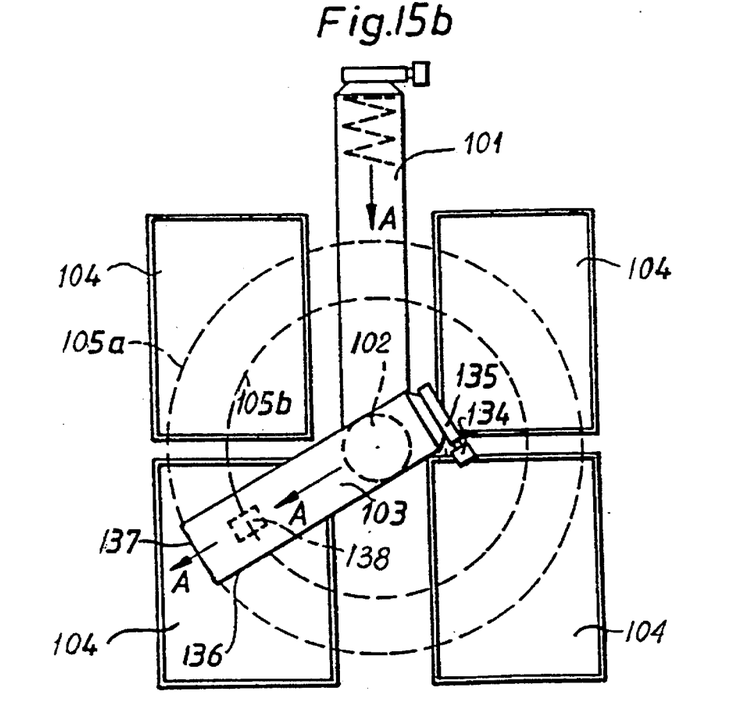

As shown in FIGS. 15b, 15b the discharge section 136 of the third combination is movable along the periphery of a circle when the third casing is turned in the bearing 160. As a result the combination is adjustable as required to deliver material to containers placed arbitrarily around the arrangement. The dispersed locations of the discharge openings mean that each discharge opening is moved along the periphery of a circle 15a–15b specific for the discharge opening making it feasible to obtain on unloading to a receiving container 104 a good distribution of the goods which are supplied to the container.

Material which is supplied to the first combination through the feed opening 112 in the casing 110 is conveyed by means of rotation of the spiral 111 in the direction towards the discharge opening 117 of the first casing. As is evident from FIGS. 13a and 13b a certain accumulation of material is taking place in the region adjoining the discharge opening 117 of the first casing. As a result the material after it has passed out through the discharge opening of the first combination and into the casing 120 of the second combination 102, will substantially fill the space of the receiving casing in the region of the feed opening of the casing, since the relatively thin screw-blade 158 of the shaftless spiral 121 in the second casing in reality does not constitute an obstacle to the conveying of the material. The material passes into the second casing underneath as well as above the screw-blade 158 of the rotating spiral 121. Material supplied in the region of the feed opening 122 of the second casing forms material bridges with material passing in as well as with material already present in the second casing. As a result action of forces arise between the screw-blade 158 of the shaftless spiral and the material which is present in the casing and between material acted on by the screw-blade and material which surrounds the material acted on by the screw-blade, which also refers to material adjoining the inner boundary of the casing. The surrounding material, and to a certain degree also the material directly acted on by the spiral, abut against the inner boundary of the casing and are hindered by the friction effect from accompanying the spiral in its rotation. This brings about a relative movement between the screw-blade 158 of the second spiral and the material. Now, when the spiral thread passes through the materials, it is lifted up accordingly, and subsequently, after the spiral has passed by, it falls back towards the lower end of the casing. During the period when the material is lifted up by the spiral, however, material is supplied from the discharge section 116 of the first casing into the cavities which are formed underneath the material lifted up by the thread in the second casing, at the same time as the friction-promoting bridges mentioned are formed, underneath as well as above the screw-blade of the spiral thread, between material abutting against the screw-blade and surrounding material. Through successive rearrangement and injection of material from the first combinations, the whole space in the casing of the second combination is thus gradually filled with material.

One precondition for the material to be lifted is that the capacity of the material to accompany the spiral in its rotation has to be reduced, and this can be achieved provided the distribution of friction forces indicated in the foregoing passage exists. It thus has been found surprisingly that the supply of material provided by means of the first spiral, and which in the first instance goes into the cavities formed underneath the rotating thread of the second spiral, establishes friction forces between material bodies and between the material and its environment including the inner boundary of the casing of a magnitude and direction which causes the material in the casing of the second combination to move at a slower speed in the direction of rotation of the spiral than the spiral itself and, at least in certain parts, to be completely slowed down. As a result a substantially coherent material body is formed from the bottom of the casing, and this material body is moved towards the discharge end of the casing. It has been found surprisingly that when supply of material through the discharge opening 117 of the first casing ceases, the movement of material in the vertical direction also stops, since on rotation of the second spiral only a rearrangement of the material, but, by and large, no vertical conveying of the same, is taking place.

The shaftless spiral of the second combination is dimensioned so as to have a pitch, a blade width, a cross-section and/or a speed of rotation of the spiral which causes the transport capacity of the second combination to exceed the conveying capacity to which the first combination has been adjusted. As a result a compression of material following accumulation of material in the discharge section 116 is avoided. Such a compression could lead to great mechanical stresses on the casing as well as spiral and could lead to these means having to be over-dimensioned at least in the transition region in order to obtain the necessary mechanical stability. As a rule the conveying capacity of the second combination is regulated in each application by means of the speed of rotation and/or the thread pitch of the second spiral.

As an example of suitable data for the second combination the spiral may be rotated at a speed of approx. 30–80 rpm, preferably 40–50 rpm, the spiral may have a diameter of approx. 150–400 mm, preferably approx. 200–300 mm, the ratio between the pitch of the spiral and its diameter may be greater than approx. 0.30, as a rule greater than approx. 0.50 and preferably greater than approx. 0.75, and the width of the screw-blade may constitute approx. 20–40%, preferably approx. 25–35% of the spiral diameter. The width of the screw-blade here refers to the extension of the screw-blade in a direction corresponding substantially to a radial direction from the geometric center axis of the spirals. For certain materials extremely large thread pitches may be used, for example, a thread pitch of the order of magnitude of the outer diameter of the spiral. By using a large thread pitch the spiral is stiffened.

In the embodiments where the discharge section of the second casing 120 is connected to a subsequent combination of casing 130 and spiral 131 it has been found surprisingly to be possible to allow the second casing as described above to open from underneath into the casing of the third combination (see FIG. 14), that is to say to allow the casing of the third combination to lack a boundary surface in the region of the discharge opening of the second casing. The reason is that, surprisingly, it has been found that on rotation of the third spiral around its axis, and on feeding of material into the third casing through a feed opening arranged as described above, the material present in the second combination and in the joint hinders the material introduced into the third casing from falling back down into the second casing, as a result of which on rotation of the third spiral the supplied material is conveyed in the direction towards the discharge end of the third casing.

In FIG. 15*a* is shown how the arrangement co-operates with two receiving tanks 104, whereas FIG. 15*b* shows how the arrangement equally simply co-operates with several, for example four, such receiving tanks. Because the combination 103 is turnable, and as a rule is provided with a number of unloading openings, it will be evident that it is easy to achieve good filling even with material which has steep drop surfaces. Owing to the combination 103 being provided with a spiral capable of pushing and a spiral end free at the discharge end with axial discharge facilities, it is also evident that in certain applications the tanks are filled by the material being pressed out into the tanks. The arrows A in FIGS. 15*a*, 15*b* mark the path of movement of the material.

The casing cross-section in the third combination is preferably U-shaped. In applications where the material is to be pressed out into the tanks a substantially circular cross-section is chosen as a rule, at least in the discharge section of the arrangement.

In the above description it is specified that the first combination 101 comprises a spiral thread 111 lacking a mechanical central shaft. It is the task of the first combination to constitute the feeding means for the supply of material into the casing 120 of the second combination 102 through the feed opening 122 of the latter. It will be obvious to those skilled in the art that the invention embraces the possibility, especially when the first combination is short, to allow the first spiral thread to be a conveyor screw provided with shaft. The essential point for the effect aimed at is that the first spiral thread terminates closely adjoining the region through which passes the screw-blade 158 of the spiral 121 of the second combination.

What is claimed is:

1. An apparatus for reducing the sizes of components in a material flow comprising a first elongated casing having an open end, a first shaftless spiral disposed in said first casing, said first shaftless spiral comprising a continuous blade wound spirally at a determined pitch and forming a free central annular passage longitudinally along the length of the spiral, supply means combined with said casing for feeding the material thereinto, a first drive means for rotating said first shaftless spiral in said first casing to cause said first spiral to advance said material through said first casing, said first casing having an outlet at said open end towards which the material is advanced by said first spiral, said first spiral having an end region with a terminal free end, beyond which said first casing includes an end section, counterpressure means for opposing advance of said material in said end section to form a compaction zone in said end section in which said material is compacted, said central passage in said first shaftless spiral providing communication at said terminal free end of said first spiral between the material in said end section and the material in the shaftless spiral, said first shaftless spiral having a substantially uniform outer diameter, said first casing having a substantially uniform cross section surrounding said end region of said first spiral, means including drainage openings distributed in said first casing inclusive of said end region of said first spiral for removal of liquid from the material during passage of the material in said first casing and a cutting means for reducing the size of components in said material when discharged from the compaction zone.

2. The apparatus as claimed in claim 1, wherein said cutting means comprises a second shaftless spiral enclosed in a second casing, said first casing having a discharge opening located in the axial direction of the first casing to supply said material to a feed opening of said second casing provided in a longitudinal boundary wall of the second casing.

3. The apparatus as claimed in claim 2, wherein the distance between the free end or said first shaftless spiral and the outer edge of said second shaftless spiral corresponds to at least half the outer diameter of said first spiral.

4. The apparatus as claimed in claim 2, wherein a second drive means for driving said second shaftless spiral in said second casing is separate and distinct from the drive means for the first shaftless spiral, said drive means for driving the second shaftless spiral being located remotely from the discharge outlet of the second casing, said second shaftless spiral extending freely and unsupported in said second casing from said drive means.

5. The apparatus as claimed in claim 2, wherein said second casing is rotatably connected to said first casing to be adjustably fixed in a predetermined orientation.

6. The apparatus as claimed in claim 2, wherein said second casing has a substantially vertical orientation.

7. The apparatus as claimed in claim 2, wherein at least said first casing has at least one corner.

8. The apparatus as claimed in claim 2, wherein said second casing and said second shaftless spiral from said counterpressure means.

9. The apparatus as claimed is claimed 8, wherein said second spiral is furnished with a plate covering a part of the outer circumference of said second spiral in the region of the feed opening of said second casing enabling a closure of the passage between said first and second casings.

10. The apparatus as claimed in claim 9, wherein said plate covers at least ⅛ of the circumference of said spiral.

11. The apparatus as claimed in claim 1, wherein said counterpressure means comprises a split cone including opposed spring-loaded members at said outlet of said first casing.

12. The apparatus as claimed in claim 1, wherein said end section of said first casing has a wall with in interior surface which applies counterpressure to the material in said end section.

13. The apparatus as claimed in claim 12, wherein said wall includes means for reducing the cross-section of said end section of said first casing to apply counterpressure to the material in said end section.

14. The apparatus as claimed in claim 1, wherein said drainage openings extend in said first casing in said compaction zone.

15. The apparatus as claimed in claim 14, wherein said drainage openings in the compaction zone extend over an axial extent of the first casing which increases from a top of the casing to a bottom of the casing.

16. The apparatus as claimed in claim 1, wherein said first drive means is located remote from said terminal end of said first spiral, said first spiral extending freely without support from said drive means to said terminal end, and said shaftless spiral being closely spaced with respect to said first casing.

17. The apparatus as claimed in claim 1, wherein said first spiral has a diameter forming an outer surface closely confronting said first casing to form slight play with said first casting.

18. The apparatus as claimed in claim 1, wherein said counterpressure means comprises a second casing having a substantially horizontal orientation.

\* \* \* \* \*